United States Patent [19]

Thompson et al.

[11] Patent Number: 4,986,387

[45] Date of Patent: Jan. 22, 1991

[54] FORK-LIFT TRUCK HAVING THREE DRIVE WHEELS WITH THIRD WHEEL STEERABLE

[75] Inventors: Thomas K. Thompson, Granville; Jack R. Mauck, Grove City, both of Ohio

[73] Assignee: Teledyne Princeton, Inc., Rexsdale, Canada

[21] Appl. No.: 389,976

[22] Filed: Aug. 7, 1989

[51] Int. Cl.$^5$ .................. B62D 61/06; B62D 5/06
[52] U.S. Cl. .................. 180/212; 180/151; 180/148; 180/908; 180/253; 180/242; 180/132
[58] Field of Search .............. 180/212, 151, 148, 908, 180/253, 242, 24, 211, 213, 132, 233; 280/98, 99, 100, 91

[56] References Cited

U.S. PATENT DOCUMENTS

| | | | |
|---|---|---|---|
| 2,942,677 | 6/1960 | Gray | 180/212 |
| 3,067,831 | 12/1962 | Willock | 180/253 |
| 3,306,390 | 2/1967 | Jamme | 180/213 |
| 3,889,782 | 6/1975 | Geis | 180/908 |
| 3,998,288 | 12/1976 | Aoki | 180/211 |
| 4,157,125 | 6/1979 | Bushell et al. | 180/212 |
| 4,369,855 | 1/1983 | Buschbom et al. | 180/242 |
| 4,373,600 | 2/1983 | Buschbom et al. | 180/212 |
| 4,676,335 | 6/1987 | Adams | 180/132 |

FOREIGN PATENT DOCUMENTS

| | | | |
|---|---|---|---|
| 565119 | 10/1958 | Canada | 180/151 |
| 1251296 | 12/1960 | France | 180/151 |

*Primary Examiner*—Charles A. Marmor
*Assistant Examiner*—Tamara L. Finlay
*Attorney, Agent, or Firm*—Sidney W. Millard

[57] ABSTRACT

A fork-lift truck supported by two front wheels and a rear wheel carried by a dolly assembly. The dolly assembly is pivoted for movement about a vertical axis and a rack and pinion unit is provided to control the pivoting for steering with the rear dolly wheel. Hub units are provided in each wheel that include a hydraulic motor and an axially aligned torque hub to obtain the desired traction for each wheel.

12 Claims, 6 Drawing Sheets

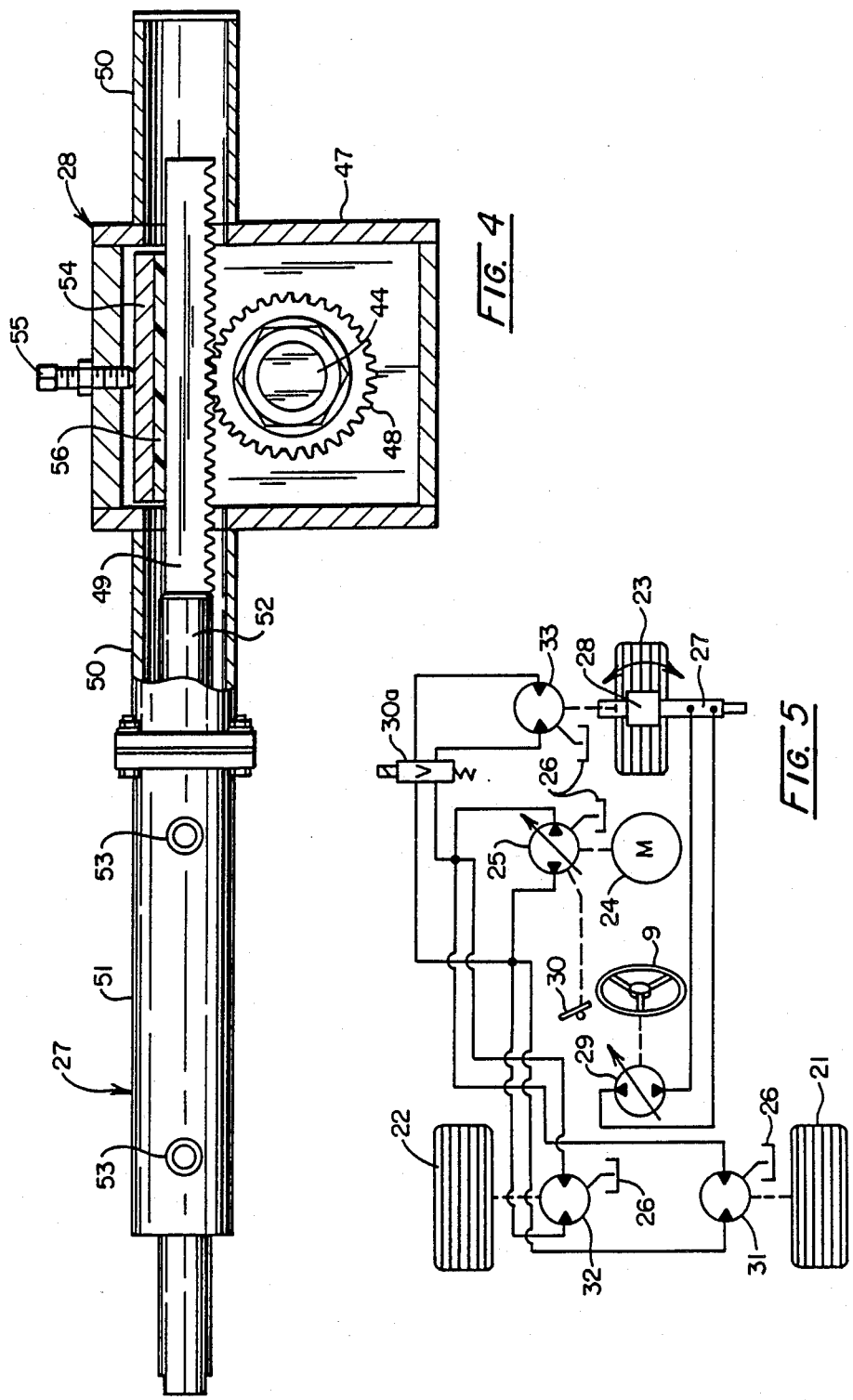

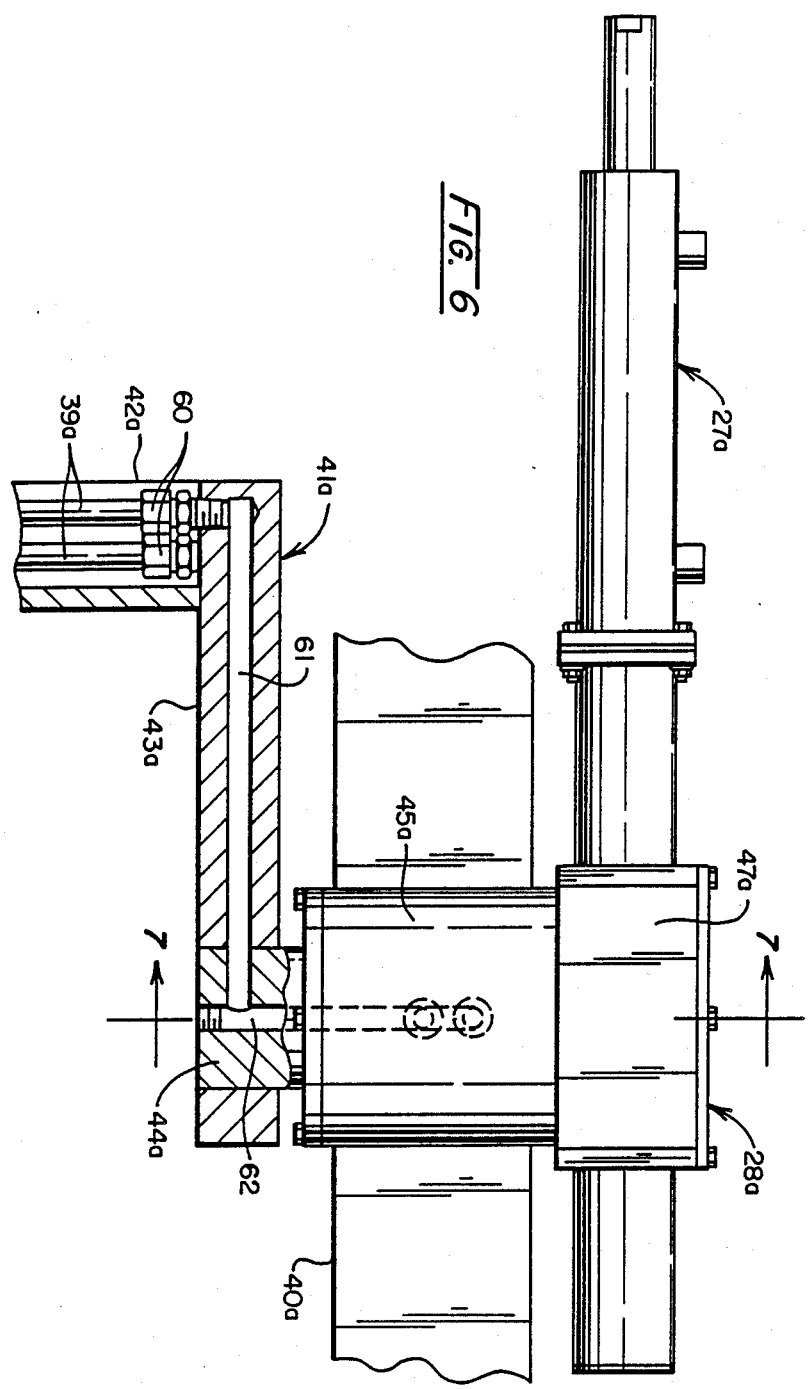

FORK-LIFT TRUCK HAVING THREE DRIVE WHEELS WITH THIRD WHEEL STEERABLE

FIELD OF THE INVENTION

This invention relates to that type of fork-lift truck which has independently driven wheels consisting of a pair of driven wheels and a third driven wheel, the third wheel being steerable.

BACKGROUND OF THE INVENTION AND PRIOR ART

Fork-lift trucks have been provided in the prior art with a pair of driven wheels and a driven, steerable third wheel which not only facilitates steering but also gives considerably more traction when needed such as in mud, soft soil or the like. These wheels are of the same size and are driven by hydraulic motors associated with the respective wheels. The steerable wheel is mounted for pivoting movement about a vertical axis and a rack and pinion arrangement has been used in the prior art for controlling the pivoting of the wheel support about the vertical axis. With tractors having the driven three wheel arrangement all of the wheels are driven at the same time but the drive for the third wheel is not always needed when conditions of the terrain are good which results in an unnecessary expenditure of fuel.

SUMMARY OF THE INVENTION

The present invention provides a fork-lift truck which has two-front wheels of equal size and a third rear modified driven dolly wheel which is smaller and is swivelled for steering. A special rack and pinion system is provided for this steering and is hydraulically actuated. Fluid motors are provided for driving all three wheels independently. However, the hydraulic motor for the single rear dolly wheel and the two front wheels, although receiving fluid from the same manifold, are geared to the respective wheels so that the single smaller third wheel is driven at a predetermined faster speed than the two larger wheels. The result of this arrangement is that a balanced traction wheel system is provided with the speed of rotation of the rear dolly wheel and the front wheels being different but the linear travel over the surface on which they operate being the same. The three wheel drive may not be needed under normal traction conditions and, therefore, the hydraulic system of this invention provides for means to selectively engage or disengage the hydraulic motor which drives the third dolly wheel. A special dolly assembly is provided at the rear wheel and may include a hydraulic fluid supply gland for its motor which does not require flexible hoses.

BRIEF DESCRIPTION OF THE DRAWINGS

The best mode contemplated in carrying out this invention is illustrated in the accompanying drawings in which:

FIG. 4 is an enlarged sectional view taken along line 4—4 of FIG. 2;

FIG. 5 is a schematic diagram of the hydraulic drive and steering system of the truck;

FIG. 6 is a vertical sectional view of a different rear or dolly wheel assembly.

DETAILED DESCRIPTION OF THE DRAWINGS

Figure 1:
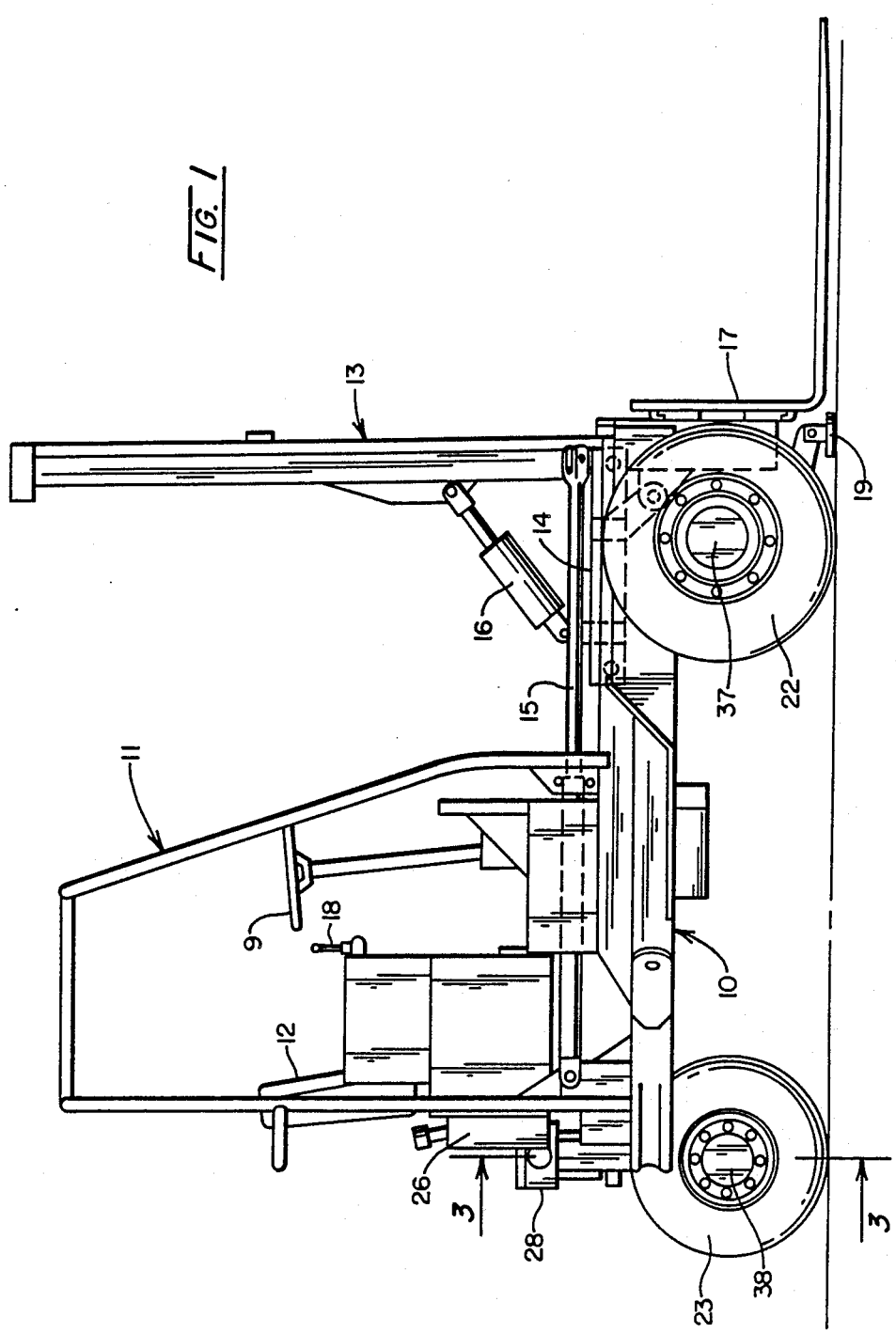
FIG. 1 is a side elevational view of a fork-lift truck embodying this invention.
Figure 2:
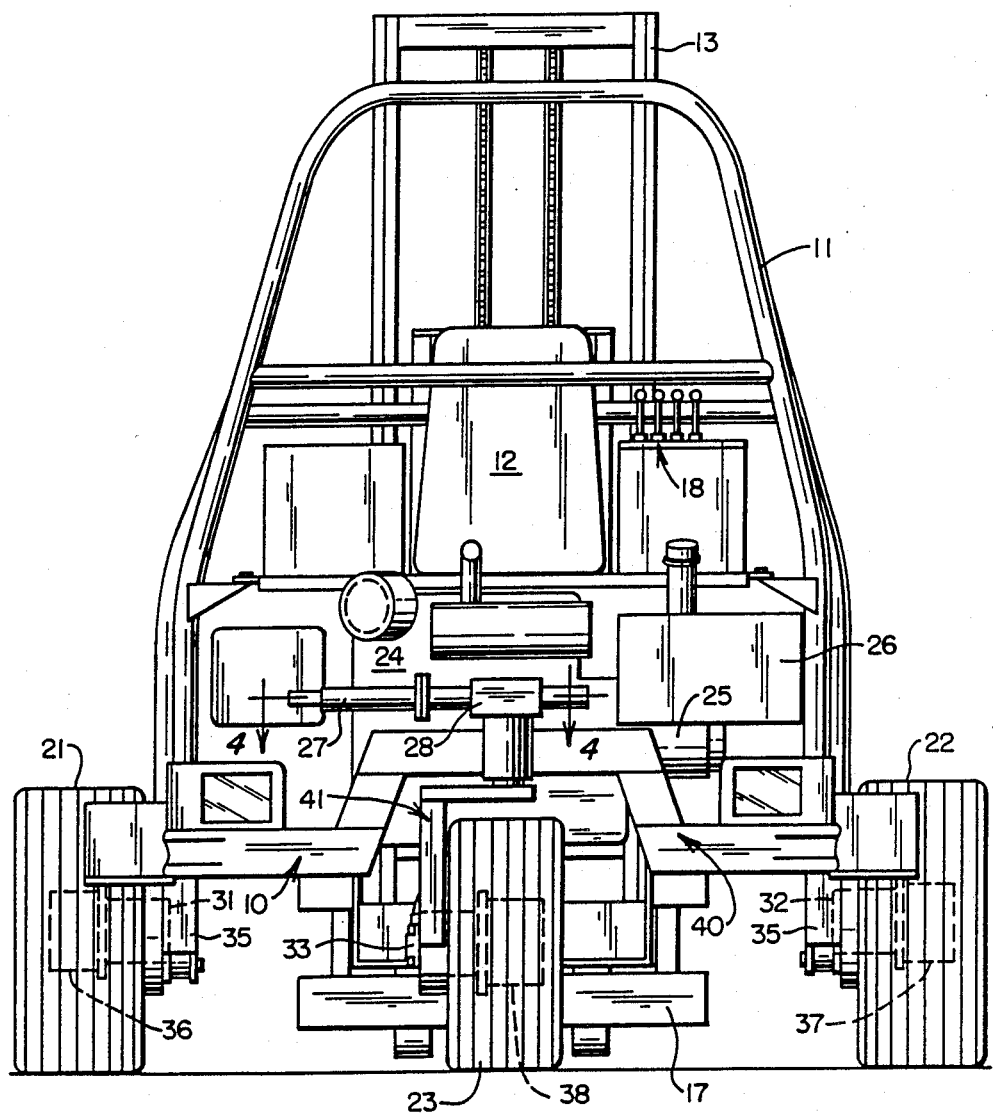
FIG. 2 is a rear elevational view of the fork-lift truck.

With reference to the drawings, FIGS. 1 and 2 show the general arrangement of the fork-lift truck in which this invention is embodied.

The general arrangement of the truck is similar to prior art fork-lift trucks and comprises a chassis or main frame 10 having an upstanding safety frame 11 in which the operator's seat 12 is located adjacent a steering wheel 9. A mast 13 is pivotably supported at the front of the frame 10 on a carriage 14 which is mounted for forward and rearward reciprocating movement under the control of a cylinder and piston unit 15. Tilting of the mast 13 is under the control of a cylinder and piston unit 16. The mast 13 may carry the fork-lift 17 in the usual manner. Stabilizing shoes 19 may be mounted on the frame and controlled in the usual manner. All of the described units are controlled by a hydraulic system common in the art and actuated by a bank of control handles 18 convenient to the operator's seat 12. The main frame 10 is carried by two front wheels 21 and 22 at the sides of the frame and a rear wheel 23 which is arranged at the longitudinal centerline of the frame in trailing relationship to the front wheels.

The frame 10 also carries a main gas motor 24 which drives a hydraulic pump 25 that supplies fluid from a reservoir 26 carried thereby to hydraulic motors 31, 32 and 33 which drive the respective wheels 21, 22 and 23 and which are part of the hydraulic system illustrated schematically in FIG. 5. This system also includes a double-acting cylinder and piston unit 27 that controls a rack and pinion unit 28 for steering the rear dolly wheel 23. A valve 29 actuated by the operator's steering wheel 9 controls flow of fluid to the cylinder and piston unit 27. A forward and reverse linkage 30 actuated by rocking the steering column or the foot pedal is also connected in the hydraulic pump 25. A selector valve 30a may be set to disconnect the rear wheel driving motor 33 from the system.

The front wheels 21 and 22 are supported from the frame 10 (FIGS. 1 and 2) by depending supports 35. Each wheel has its hydraulic drive motor along with a torque hub. This arrangement is shown generally in FIG. 2 and more clearly at the rear wheel in FIG. 3. For the wheel 21 the torque hub is shown at 36 in axial alignment with the motor 31. For the wheel 22 the torque hub is shown at 37 in alignment with the motor 32. These motors and connected torque hubs are standard in the art and each hub is of a gear type and can be selected to produce the desired torque. Obviously, the two hubs 36 and 37 would be geared the same. The hydraulic motors for the front wheels and the rear wheel may be different, the respective motors being selected in accordance with the gear ratios of the respective hubs. Each motor is selected to give only sufficient power to drive its connected torque hub to attain the desired torque. A suitable hydraulic motor for each of the front wheels is manufactured by EATON and is #74418. For the rear wheel a suitable unit is by CHAR- LYN #104-1018. A suitable torque hub is manufactured by FAIRFIELD and #W18J is used at the front wheels and #W07A is used at the rear wheel.

The dolly wheel 23 (FIGS. 1-3) is similar to the front wheels 21 and 22 but is much smaller which facilitates its mounting on a frame yoke 40 at the rear of the frame 10. This wheel has the hydraulic drive motor 33 and aligned torque hub 38 which as indicated above are of standard type. The drive motor 33 and hub 38 combination are selected so that less torque is applied to the wheel 23 than applied to the front wheels 21 and 22 by their respective hubs 36 and 37 but the result is equal traction force on each wheel.

As indicated, the dolly wheel 23 is supported from the yoke 40 at the rear of the frame 10. It is supported by means of a dolly assembly 41 indicated generally in FIG. 2 and in detail in FIG. 3. This dolly assembly includes a weldment dolly having a depending hub support 42 connected to a hub unit 39 and a horizontal upper pivot arm 43 which is non-rotatably fixed to the depending extremity of a spindle 44. The hub 39 carries the motor 33 and an axially-aligned torque hub 38 connected thereto by coupling 38a. The spindle 44 is supported by the frame yoke 40 at the centerline of the machine and spaced laterally equidistant from the front wheels 21 and 22. This spindle is rotatably mounted in a spindle tube 45, carried by the frame yoke 40, by means of vertically spaced roller bearings 46. Thus, the dolly assembly 41 is mounted for forward and rearward movement about the axis of the spindle 44 and this will result in steering of the wheel 23. Fluid lines 29 will be connected at their inner ends to the hydraulic motor 33 and will include flexible sections to permit swiveling of the dolly wheel assembly about the axis of spindle 44.

Figures 3, 3A:
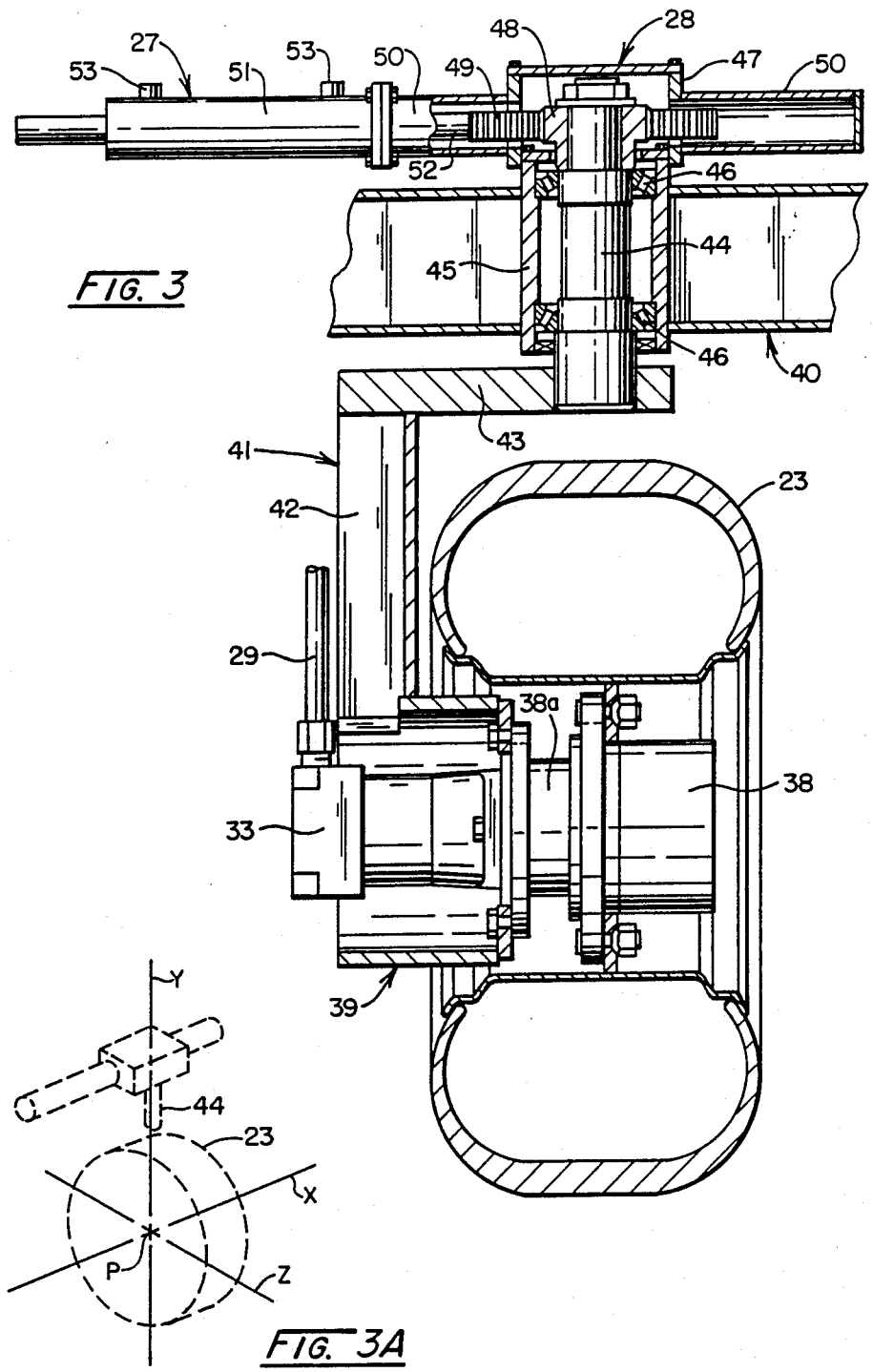
FIG. 3 is an enlarged vertical sectional view taken along line 3—3 of FIG. 1 showing the modified dolly wheel assembly.
FIG. 3a is a schematic illustration of various axes at the dolly assembly.

In FIG. 3a, the various axes of the dolly assembly 41 are illustrated. The horizontal axis of the hub assembly or wheel rotation is indicated at X. The vertical axis of the spindle 44 is indicated at Y and is normal to axis X and in the same vertical plane Z as the vertical center plane of the wheel 23. All of these axes meet at a point P which is along the axis of application of torque. Thus, the arm 43 of the spindle assembly 41 positions the wheel 23 in such a manner that its vertical center plane which is normal to its axis of rotation is in the same vertical plane as the axis of the spindle 44.

To produce this swiveling movement of assembly 41 effectively the rack and pinion unit 28 previously mentioned is provided in cooperation with the upper end of the spindle 44 (FIGS. 3 and 4). The spindle tube 45 is joined at its upper end to a gear box 47 which has a pinion 48 disposed therein, this pinion being keyed on the upwardly projecting end of the spindle 44. This pinion engages with a horizontal rack 49 which is disposed for reciprocation in a tubular extension 50 connected to the cylinder 51 of cylinder and piston unit 27. The rack 49 is connected to the adjacent end of the piston rod 52 of that unit. Thus reciprocation of the rack 49 by the cylinder and piston unit 27 will result in rocking of the spindle 44. Fluid lines will be connected to the cylinder 51 at connectors 53. To take up wear between the rack 49 and the pinion 48 an adjustable block 54 is provided in the gear box 47 and is adjustable towards the rack 49 by means of a set screw 55. This block 54 carries a bearing pad 56 which slidably engages the smooth back of the rack 49 and which is made of plastic, preferably of high molecular polypropylene. Adjustment of screw 55 from time-to-time will maintain tight contact of rack 49 with the pinion 48. Controlling of the cylinder and piston unit 27 by the steering wheel 9 will result in swinging the dolly assembly 41 for the wheel 23 about the vertical axis of the spindle 44 through the rack and pinion unit 27. This will be accomplished with ease due to the described arrangement of the various axes illustrated in FIG. 3a.

Figure 7:
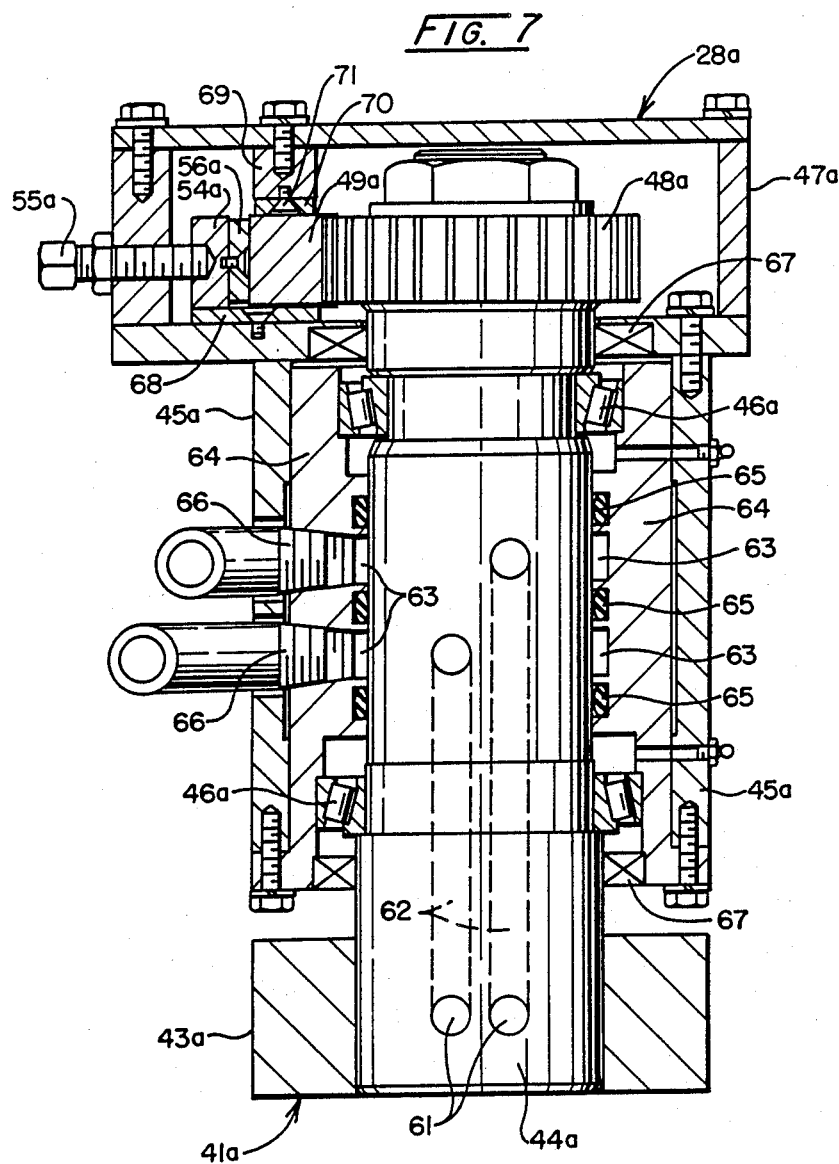
FIG. 7 is a vertical sectional view taken on line 7—7 of FIG. 6.

In FIGS. 6 and 7, a different form of dolly assembly 41a is illustrated which includes a different rack and pinion wear take-up arrangement and a gland type fluid-supply system for the hydraulic drive motor that drives the dolly wheel 23. This supply system includes a gland so that flexible lines will not be required. In this structure, the lines 39a are connected to the motor at their lower ends and lead upwardly along hub support 42a to the pivot arm 43a where they are connected by fittings 60 to passages 61 leading through the arm to vertical passages 62 formed in the spindle 44a with which they communicate. The passages 62 terminate at different levels and communicate with annular grooves 63 formed at corresponding levels in a tubular gland 64 disposed within the spindle tube 45a. Seals 65 of the O-ring type are provided at opposite sides of the annular grooves 63 in the member 64. Fittings 66 extend radially through spindle tube 45a and gland 64 to communicate with the respective grooves 63 and are connected to lines of the hydraulic system. Roller bearings 46a are provided around the spindle 44a in the gland 64. Also around the spindle are seals 67. With this fluid supply arrangement for the drive motor 33 of the wheel 23 it will be apparent that no flexible lines are necessary to permit swinging of the dolly assembly 41a.

The rack and pinion unit 28a is actuated by the cylinder and piston unit 27a as before but has some differences. It includes the gear box 47a in which the pinion 48a is disposed and meshes with the rack 49a. The wear take-up arrangement is provided as before consisting of the block 54a movable by the set screw 55a, the block carrying the bearing pad 56a which is preferably of high molecular polypropylene. However, in addition means is provided for keeping the rack 49a downwardly in contact with a bearing strip 68 on the bottom of the gear box 47a so it will always be aligned with the pinion. This is accomplished with a block 69 which has bearing strip 70 that is kept in contact with the top surface of rack 49a by a set screw 71 in the top of the gear box 47a.

It will be apparent from the above description that this invention provides a fork-lift truck which includes two front wheels of equal size and a third rear modified power driven dolly wheel which is smaller and is swivelled for steering. A special rack and pinion arrangement is provided for effectively accomplishing and controlling the steering. Each wheel is driven by a separate hydraulic motor and a connected torque hub. The front wheels are of larger diameter than the rear wheels and the torque hubs thereof are selected to provide a predetermined torque thereto. The differential in torque is predetermined so that the front wheels and the rear dolly wheel will have the same tractive force over the surface on which the truck operates resulting in uniform traction of all the wheels. The operation of the hydraulic motor for the dolly wheel can be interrupted as desired when not needed.

Having thus described the invention what is claimed is:

1. A fork-lift truck comprising a main frame supported by two front wheels of the same diameter at opposite sides of the frame, a rear wheel of much smaller diameter supported by a dolly assembly at the rear of the frame, said dolly assembly being pivoted to the frame for swinging about a vertical axis for steering, means for swinging the assembly about its pivot to steer the truck with said rear wheel, each of the wheels having a hub with a hydraulic motor and an axially aligned torque hub, the torque hub and motor combination of the rear wheel being selected to apply a differential torque as compared to that applied by the torque hubs and motor combinations of the front wheels so that the front wheels and rear wheel will have the same tractive force over a surface on which the truck operates.

2. A fork-lift truck according to claim 1 comprising means for selectively interrupting the drive of the rear wheel by said hydraulic motor at the hub thereof.

3. A fork-lift truck according to claim 1 comprising a rack and pinion unit for swinging the dolly assembly about its pivot, and a hydraulic cylinder and piston unit for reciprocating said rack, said hydraulic cylinder being in fluid communication with a hydraulic system which is in fluid communication with said hydraulic motors.

4. A fork-lift truck according to claim 1 comprising a supporting frame yoke secured to the main frame at the rear thereof to support the dolly assembly, said dolly assembly having a horizontal pivot arm fixed to a vertical spindle, a bearing unit for rotatably supporting said vertical spindle on the yoke at the longitudinal center line of the frame, the rear wheel hub depending from said arm, said rear wheel hub includes the hydraulic motor and the connected axially aligned torque hub for driving the rear wheel.

5. A fork-lift truck according to claim 4 in which the axis of the spindle is in a common vertical plane with the center plane of the rim wheel that is normal to the axis of the wheel hub.

6. A fork-lift truck according to claim 4 including a rack and pinion unit mounted on said yoke for swinging said pivot arm about the axis of said vertical spindle.

7. A fork-lift truck according to claim 6 including a cylinder and piston unit carried by said yoke for reciprocating said rack to turn said spindle to swing said arm.

8. A fork-lift truck according to claim 7 in which the pinion is carried by said vertical spindle and the rack is longitudinally reciprocable in engagement therewith, and a wear take-up for keeping the rack and pinion in engagement, said wear take-up comprising a block mounted for movement into engagement with said rack opposite the pinion, and means for moving said block towards the rack.

9. A fork-lift truck according to claim 8 in which said block carries a pad of high molecular polypropylene for engaging said rack.

10. A fork-lift truck according to claim 8 including means for engaging the upper surface of said rack to hold it down in alignment with said pinion.

11. A fork-lift truck according to claim 8 in which fluid connections are provided for the rear wheel motor through the pivot arm and the spindle to permit swinging of said arm without flexible hose connections to said rear wheel motor.

12. A fork-lift truck according to claim 11 in which the fluid connections include a gland around said spindle connected to fixed fluid lines and passages in said spindle connecting the gland to passages in said arm.

* * * * *